United States Patent [19]

Smith

[11] Patent Number: 5,711,438
[45] Date of Patent: Jan. 27, 1998

[54] FOLDABLE, WHEELED DISPLAY STAND

[75] Inventor: Michael J. Smith, Orangeburg, N.Y.

[73] Assignee: Arrow Art Finishers, Inc., Bronx, N.Y.

[21] Appl. No.: 680,706

[22] Filed: Jul. 17, 1996

Related U.S. Application Data

[63] Continuation of Ser. No. 292,583, Aug. 18, 1994, abandoned.

[51] Int. Cl.$^6$ .................................................. A47F 5/08
[52] U.S. Cl. .................. 211/149; 248/174; 280/47.24; 280/47.34; 280/652
[58] Field of Search .................................. 211/149, 132, 211/186, 195; 248/174; 280/47.26, 652, 47.2, 44.37

[56] References Cited

U.S. PATENT DOCUMENTS

| | | | |
|---|---|---|---|
| Re. 32,668 | 5/1988 | Smith | 211/149 |
| 2,564,939 | 8/1951 | Weast | 280/652 |
| 3,087,740 | 4/1963 | Mitty et al. | 280/47.26 |
| 3,092,395 | 6/1963 | Mitty et al. | 280/652 |
| 3,135,527 | 6/1964 | Knapp | 280/47.26 |
| 3,285,620 | 11/1966 | Mitty et al. | 280/47.26 |
| 3,292,942 | 12/1966 | Mitty et al. | 280/47.26 |
| 3,427,040 | 2/1969 | Jenkins | 280/652 |
| 3,438,508 | 4/1969 | Kuns et al. | 248/174 |
| 3,856,320 | 12/1974 | Blanchard | 280/47.35 |
| 4,461,504 | 7/1984 | Perez et al. | 280/47.34 |
| 4,493,424 | 1/1985 | Smith | 211/149 |
| 4,570,805 | 2/1986 | Smith | 211/149 |
| 4,632,412 | 12/1986 | Nasgowitz | 280/47.26 |
| 4,646,922 | 3/1987 | Smith | 211/186 |
| 4,723,664 | 2/1988 | Smith | 211/149 |
| 5,125,675 | 6/1992 | Engelbrecht | 280/37 |

FOREIGN PATENT DOCUMENTS

| | | |
|---|---|---|
| 998158 | 7/1965 | United Kingdom . |
| WO 93/04880 | 3/1993 | WIPO . |
| WO 94/19642 | 9/1994 | WIPO . |

Primary Examiner—Ramon O. Ramirez
Assistant Examiner—Anita M. King
Attorney, Agent, or Firm—Kirschstein, et al.

[57] ABSTRACT

A pre-assembled wheeled assembly is attached as a pre-assembled unit to a foldable, erectable display stand, and is removable as a pre-assembled unit from the stand. The wheeled assembly includes a support, at least one wheel journaled on the support, and holders on the support for quick and easy attachment and removal of the wheeled assembly.

36 Claims, 4 Drawing Sheets

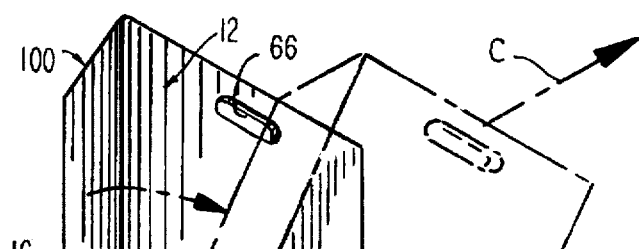
FIG. 4
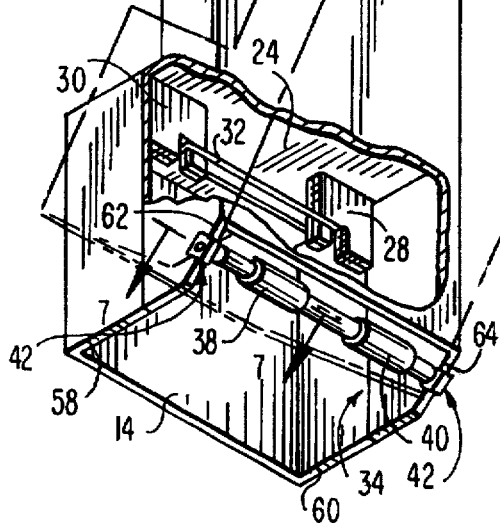
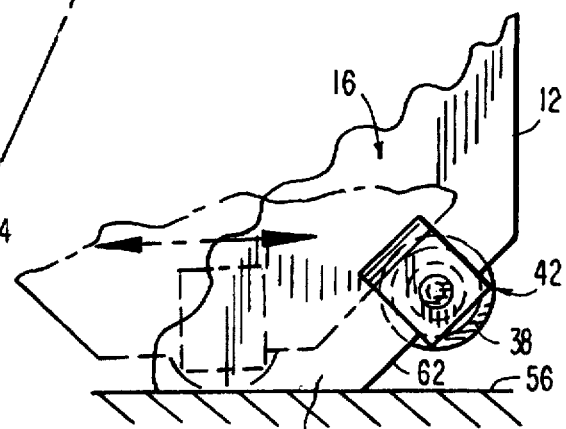
FIG. 5
FIG. 6
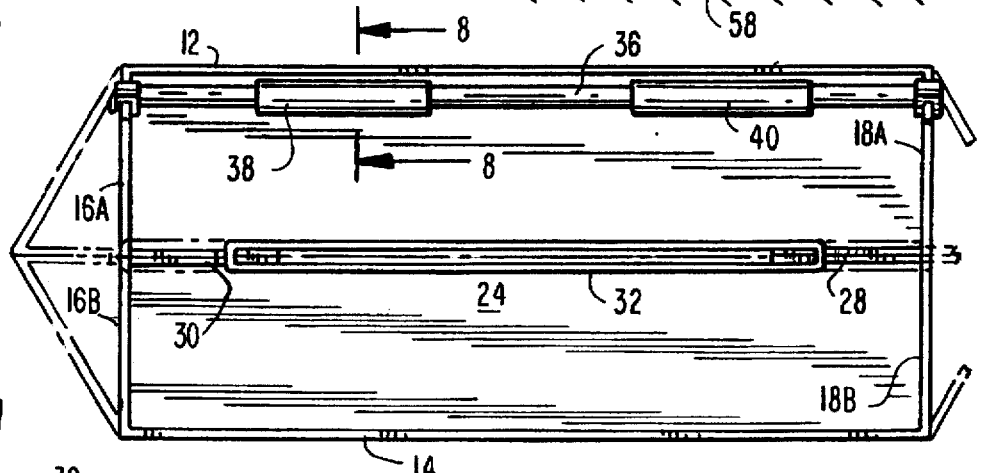
FIG. 7A
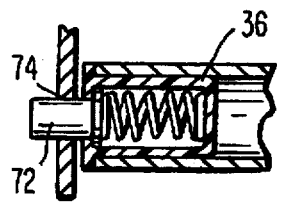
FIG. 7
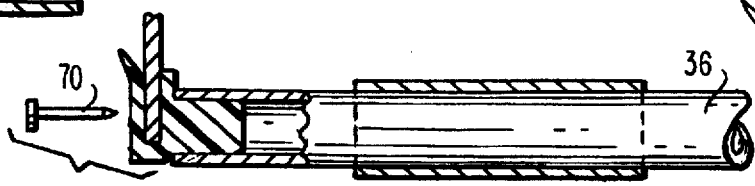
FIG. 8
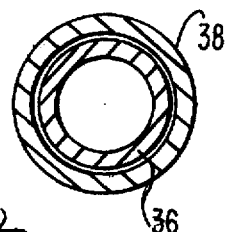

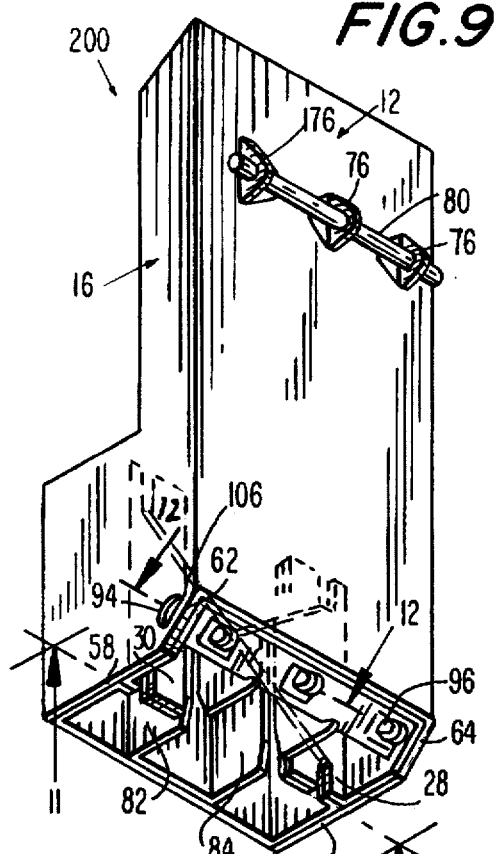
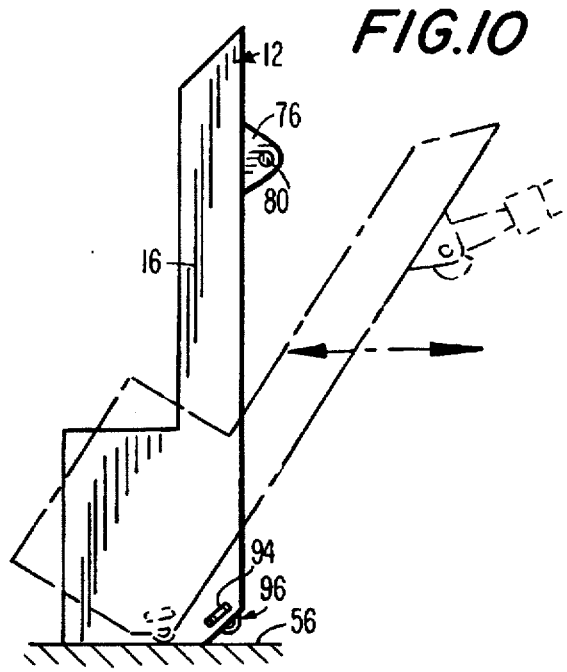
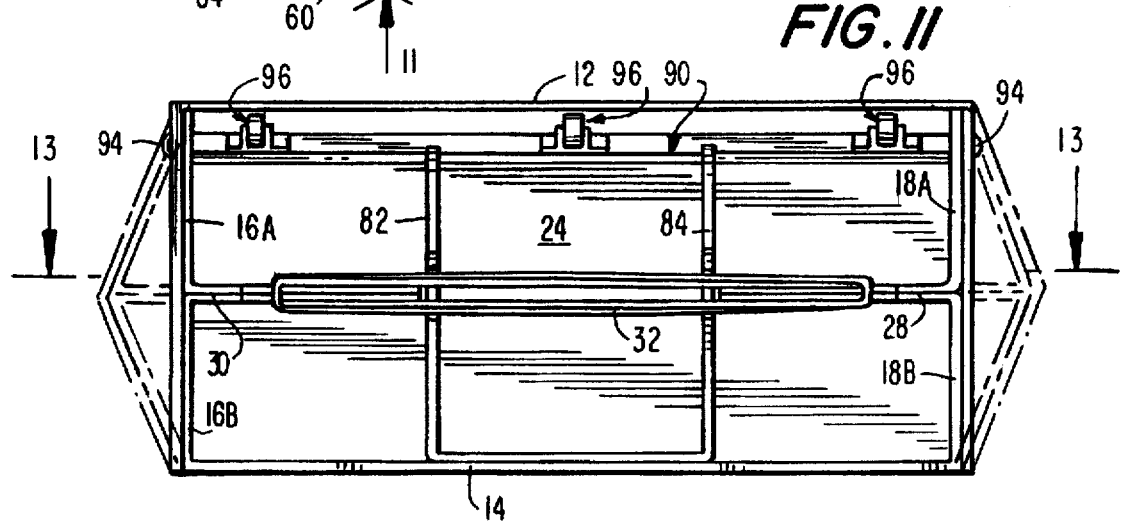
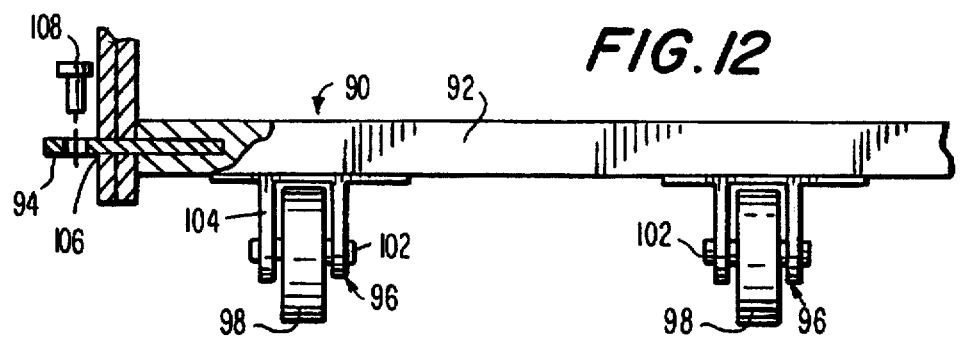

FOLDABLE, WHEELED DISPLAY STAND

This application is a continuation of application Ser. No. 08/292,583, filed Aug. 18, 1994, now abandoned.

BACKGROUND OF THE INVENTION

1. Field of the Invention

This invention generally relates to foldable, erectable display stands for supportably displaying articles and, more particularly, for enabling such stands with the articles loaded thereon to be moved to and positioned at a desired location.

2. Description of the Related Art

Foldable, erectable display stands for use, for example, in supermarkets or other retail stores for display of articles or goods on sale are already known. See, for example, U.S. Pat. Nos. 4,493,424; 4,570,805; 4,646,922; 4,723,664; and Re. 32,668. Such stands are used as alternatives to merely stacking the articles one on top of another, or displaying them in partially cut-off original cartons or boxes.

Such stands are typically manufactured at one site, collapsed into a generally flattened condition in which they occupy a minimum amount of space individually and stacked on top of one another, and then are either shipped directly to a retail store, or to a packing center or warehouse, where the stands are erected in situ, and the articles are thereupon loaded onto the erected stands. Stands packed at the packing center are transported, typically by truck, to the retail store where the loaded stands are taken off the truck and moved to a desired location in the store.

Experience has shown that the conventional, foldable, erectable display stands are highly satisfactory for their intended purpose. However, when such stands are called upon to support articles of substantial weight, e.g., beer cans, soda bottles, soap bars, etc., it has proven difficult to conveniently move the loaded stands from place to place. Thus, once a fully loaded stand is positioned in a retail store, it requires considerable effort to reposition the stand. Also, moving a fully loaded stand off a truck to a desired location in a store typically requires lifting equipment. When personnel are employed to do the heavy lifting, it is not uncommon for the loaded articles to fall off the stands during their movement through the store.

Wheeled display units of the type exemplified by U.S. Pat. Nos. 3,856,320 and 4,632,412 enabled easy movement of merchandise. However, such units were essentially hand trucks made of welded metal or rigid plastic construction. Since such units were not foldable, collapsible, or made of cardboard or like material, they were, in fact, permanent, re-usable, store fixtures, never meant to be discarded.

The art also taught in U.S. Pat. Nos. 3,292,942 and 5,125,675, shopping carts and trolleys, not erectable display stands, made of cardboard material. However, even those units had a permanent construction in the sense that their wheels were permanently mounted on the carts and trolleys, and were meant to be re-used.

SUMMARY OF THE INVENTION

Objects of the Invention

It is a general object of this invention to advance the state of the art.

Another object of this invention is to provide a wheeled, display stand erectable from a collapsed condition in which it occupies a minimum amount of space, to an erect display condition in which the stand is sturdy enough to support articles, even of substantial weight.

An additional object of this invention is to quickly and easily convert a foldable, erectable display stand to one that is easily movable.

Yet another object of this invention is to reduce the time, cost and handling normally required to move and re-position a loaded stand.

Another object of this invention is to devise a wheeled display stand which is simple in construction, inexpensive to manufacture, easy to use and reliable in operation.

Features of the Invention

In keeping with these objects and others which will become apparent hereinafter, one feature of this invention resides, briefly stated, in a foldable, wheeled display stand erectable, when unfolded, from a collapsed condition to an erect display condition. The stand comprises an upright rear panel; a shelf movable from a first position overlying the rear panel in the collapsed condition, to a load-bearing second position generally perpendicular to the rear panel in the erect display condition; and a pre-assembled wheeled assembly including a support, at least one wheel journaled on the support, and holder means on the support for attaching the wheeled assembly as a pre-assembled unit to the stand in the erect display condition, and for removing the wheeled assembly as a pre-assembled unit from the stand in the erect display condition.

The attachment and removal of the wheeled assembly as a pre-assembled unit in the erect display condition provides many benefits. Thus, the stand may be shipped in its collapsed condition to the packing center, thereby minimizing shipping costs and cargo space. The wheeled assembly is not mounted on the stand when it is in the collapsed condition, but is separately shipped. Only when it is desired to pack articles on the stand is the wheeled assembly attached to the erected stand, thereby ensuring easy movement and positioning thereof. After the articles have been sold and removed from the stand, the wheeled assembly can be easily removed from the stand and re-used, if desired, on another stand. The original stand, constituted substantially entirely of cardboard material, can be folded up and sent to a paper recycling center.

The stand includes a generally planar, upright front panel juxtaposed with the rear panel in the collapsed condition, and spaced apart from the rear panel in the erect condition. The stand includes a pair of generally planar, upright side panels extending between the front and rear panels at opposite sides of the stand. The shelf extends between the front and rear panels, and also extends between the side panels in the erect display condition.

The side panels have floor-engaging, bottom edges and, in accordance with a first embodiment of this invention, the holder means is operative for attaching the wheeled assembly to the side panels above the bottom edges in the erect display condition. The side panels have inclined, rear edges extending from the bottom edges to the rear panel, and the holder means includes a pair of end clips for slidably and frictionally engaging the rear edges. The wheeled assembly advantageously includes at least a pair of wheels mounted for turning movement between the end clips intermediate the side panels. The support is a shaft, and the wheels are cylindrical tubes journaled on the shaft in order to more uniformly distribute the weight of the articles on the stand. Lock means may be provided for locking the holder means to the side panels.

In accordance with a preferred commercial embodiment of this invention, the side panels have slots above the bottom edges, and the holder means includes a pair of end projections extending in opposite directions from the support through the slots. The wheeled assembly includes at least a pair of wheels mounted on and along the support for turning movement between the projections intermediate the side panels. Preferably, the side panels have inclined, rear edges extending from the bottom edges to the rear panel, and the slots extend parallel to the rear edges.

The stand further includes shell support means movable from a shelf non-supporting position in the collapsed condition, to a shell-supporting position in which the shell support means lies underneath the shelf and supports the shell from below in the erect display condition. Biasing means, e.g., an energy storing element, is operative for affirmatively biasing the shelf support means toward the shelf-supporting position, and for automatically moving the shelf to the load-bearing second position when the stand is unfolded from the collapsed condition.

Preferably, the shelf support means includes a pair of support panels movable towards and away from each other in a common plane which extends generally perpendicular to the shelf in the erect display condition. The support panels have upper edges on which the shelf rests in the erect display condition. The energy storing element is preferably an endless, rubber band mounted on the support panels.

The biasing means serves two functions. The first is to automatically erect the display stand. The second is to affirmatively bias the side panels toward each other and into pressing engagement with the wheeled assembly. This latter feature ensures that the wheeled assembly will stay in place on the stand.

In still another embodiment of this invention, an additional wheeled assembly and an additional holder means are provided for attaching the additional assembly as a pre-assembled unit to the stand in the erect display condition. The front and rear panels have bottom edges, and the holder means and the additional holder means are operative for attaching both wheeled assemblies on the bottom edges of the front and rear panels. Alternatively, the holder means and the additional holder means may be used for attaching both wheeled assemblies on the bottom edges of both side panels.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a rear perspective view of another embodiment of an erected, wheeled display stand in accordance with this invention, the phantom lines depicting a tilted condition for the stand;

FIG. 5 is a broken-away, enlarged, elevational view of a rear corner region of the stand of FIG. 4;

FIG. 6 is a bottom plan view of the stand of FIG. 4, the phantom lines depicting movement of certain panels;

FIG. 7 is an enlarged, broken-away sectional view taken on line 7—7 of FIG. 4, with a locking pin shown in exploded view;

FIG. 7A is an enlarged view analogous to FIG. 7, but of a modified locking pin;

FIG. 8 is an enlarged sectional view taken on line 8—8 of FIG. 6;

FIG. 9 is a rear perspective view of yet another embodiment of an erected, wheeled display stand in accordance with this invention;

FIG. 10 is an elevational view of the embodiment of FIG. 9, the phantom lines depicting a tilted condition for the stand;

FIG. 11 is a bottom plan view of the stand of FIG. 9 taken on line 11—11 of FIG. 9;

FIG. 12 is an enlarged, broken-away, sectional view taken on line 12—12 of FIG. 9, with a locking pin shown in exploded view;

DETAILED DESCRIPTION OF THE PREFERRED EMBODIMENTS

Figure 1:
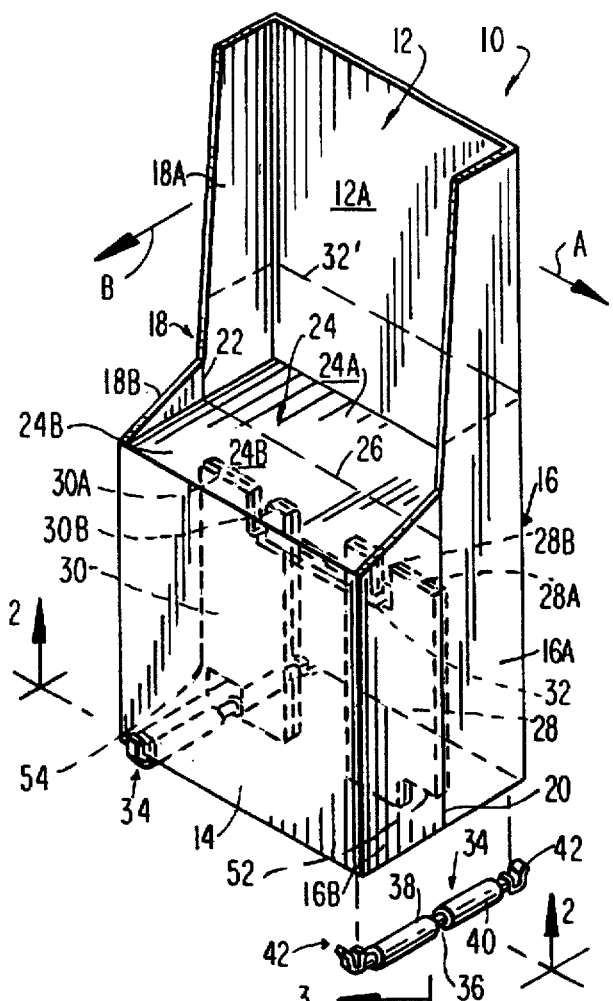
FIG. 1 is a front, perspective view of one embodiment of an erected, wheeled display stand in accordance with this invention, one of the wheeled assemblies being shown in exploded view for clarity.

Referring now to the drawings, reference numeral 10 in FIG. 1 generally identifies one embodiment of a foldable, wheeled display stand having a rear panel 12; a front panel 14; a first side panel 16 having side panel portions 16A, 16B foldable about upright fold line 20; a second side panel 18 having side panel portions 18A, 18B foldable about upright fold line 22; a shelf 24 having shelf portions 24A, 24B foldable about horizontal fold line 26; a pair of shelf support panels 28, 30 underneath the shelf 24 and having upper edges 28A, 30A on which the shelf 24 rests for support; and an energy storing element, e.g., an endless rubber band 32 mounted in slots 28B, 30B of the shelf support panels. The panels are constituted of corrugated board material.

The stand of FIG. 1 is shown in its erect display condition in which the rear, front and side panels are vertically upright; the shelf 24 is in a generally horizontal load-bearing position for supporting articles thereon; the front and rear panels are spaced apart in one direction in mutual parallelism; the side panels are spaced apart in an orthogonal direction in mutual parallelism; the shelf support panels are in a common plane and support the shelf 24 from below; and the band 32 pulls the shelf support panels toward each other and, in turn, pulls the side panels toward each other into pressing engagement with opposite ends of the shelf.

Figure 2:
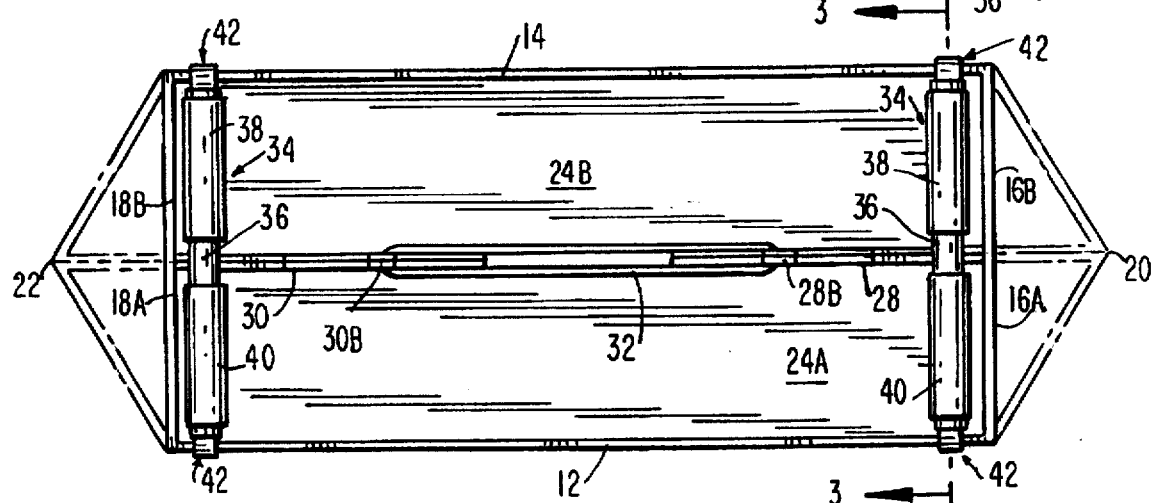
FIG. 2 is an enlarged bottom plan view taken on line 2—2 of FIG. 1, the phantom lines depicting movement of certain panels.

The stand of FIG. 1 is automatically erected from a generally collapsed condition in a manner analogous to that described, for example, in U.S. Pat. Nos. 4,570,805; 4,723, 664; and Re. 32,668. By way of brief review, when the side panel portions 16A, 18A are pushed apart to their phantom line positions as shown in FIG. 2, the side panel portions 16B, 18B fold about their respective fold lines 20, 22. In turn, the shelf support panels 28, 30 are pulled apart, thereby stretching and tensioning the band 32. The shelf portions 24A, 24B fold about their fold line 26. The front panel 14 moves in a generally overlying relationship toward the rear panel 12. An upper rear panel portion 12A is now folded about fold line 32' to at least temporarily maintain the stand in the collapsed condition. Upon unfolding the upper panel portion 12A, the energy stored in the tensioned band is sufficient to automatically erect the stand by pulling the shelf support panels 28, 30 and, in turn, the side panels toward each other. This action is directly translated into moving the front panel away from the rear panel, and into unfolding the shelf portions 24A, 24B to lie in a common plane.

In accordance with this invention, at least one pre-assembled wheeled assembly is attachable as a pre-assembled unit to, and is removable as a pre-assembled unit from, the stand 10 in the erect display condition. In the first embodiment depicted in FIGS. 1-3, two such wheeled assemblies 34 are mounted on the stand 10. In FIG. 1, one of the two wheeled assemblies is shown mounted on the stand, while the other is shown in exploded view for clarity.

Figure 3:
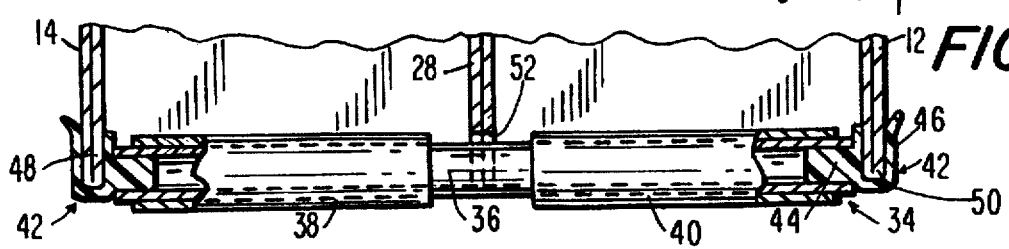
FIG. 3 is a broken-away, enlarged, sectional view taken on line 3—3 of FIG. 2.

As best shown in FIG. 3, each wheeled assembly 34 includes a support, preferably a hollow cylindrical shaft 36, on which two wheels, preferably two hollow cylindrical tubular rollers 38 and 40 are journaled. A pair of holders 42 is mounted at opposite ends of the shaft 36. Each holder 42 has a stub 44 wedged into an open end of the shaft 36, and a U-shaped clip 46 (see FIG. 3) for frictionally and slidably receiving bottom edges of the upright panels of the stand. Thus, as shown in FIG. 3, the front and rear panels 14, 12 respectively, have lower bottom edges 48 and 50 into which the clips 46 are slidably received. Each wheeled assembly in FIG. 1 extends between the front and rear panels, thereby enabling the stand to be moved sideways, i.e., in the direction of arrow A.

Of course, it is also within the spirit of this invention to mount each wheeled assembly between the side panels 16, 18 by sliding the clips 46 onto the bottom edges of the side panels. In that event, the stand would be capable of forward and rearward movement, i.e., in the direction of arrow B in FIG. 1.

Once a collapsed stand 10 has been delivered to a packing site, the stand is erected, preferably automatically as described above, and the wheeled assemblies 34 are quickly and easily mounted on the stand prior to loading articles on the shelf 24. It will be understood that such erectable stands can be provided with more than the one illustrated shelf. Once loaded, the stand can be easily moved on the rollers 38, 40. For a wider distribution of weight, the rollers 38, 40 occupy a major portion of the length of the shaft 36. Also, to help resist buckling of the stand from excess weight, the shelf support panels 28, 30 are formed with cut-outs 52, 54. As shown in FIG. 3, the shaft 36 is supported not only by the holders 42, but also by the edges bounding the cut-out 52.

Moreover, the rollers 38, 40 on both sides of the stand ensure that the stand is level with the ground, and will roll evenly across the ground without tipping. All the rollers are mounted in-board of the stand, i.e., no roller extends beyond the outer periphery of the upright panels, thereby ensuring that no person would otherwise trip over an obstacle such as a roller located exteriorly of the stand.

Turning now to the embodiment of FIGS. 4-6, the automatically erectable stand 100 is similar to the stand 10, and like parts have been identified with like reference numerals. The wheeled assembly 34 is identical to that described earlier. Rather than using two wheeled assemblies, the embodiment of FIGS. 4-6 mounts a single wheeled assembly 34 at the rear of the stand at an elevation above the ground 56 (see FIG. 5). More specifically, the side panels 16, 18 have bottom edges 58, 60 that engage the ground 56, and inclined rear edges 62, 64 that extend upwardly from the bottom edges 58, 60 to the rear panel 12. The clips 46 on the holders 42 are clipped onto these inclined rear edges 62, 64, thereby mounting the assembly 34 between the side panels 16, 18.

As shown in solid lines in FIGS. 4 and 5, the stand 100 normally rests on the bottom edges 58, 60 of the side panels, the rollers 38, 40 being elevated above the ground. To move the stand, the stand is tilted rearwardly in the direction of arrow C in FIG. 4 to its phantom line position until the rollers 38, 40 engage the ground. Thereupon, by grabbing a handle-shaped slot 66 formed in the rear panel 12, the stand can be rolled to any desired location. Again, it will be noted that the rollers 38, 40 are mounted in-board of the side panels, and are relatively long for a wide distribution of weight. FIG. 8 depicts how a representative roller 38 is journaled on the shaft 36.

As described so far, each clip 46 is clipped and frictionally retained onto the bottom edges of various panels oft he stand. In a modified mounting arrangement, as shown in FIG. 7, a locking pin 70 having a pointed end is inserted through the clip and the bottom portion of a panel in order to more securely lock the assembly in place. In another modified arrangement, as shown in FIG. 7A, each end of the shaft 36 is provided with a spring-biased button 72 which is urged outwardly through a pre-formed mounting hole 74 in a bottom region of a panel. In all cases, these mounting arrangements allow for a quick and easy attachment and removal of each wheeled assembly.

Figure 13:
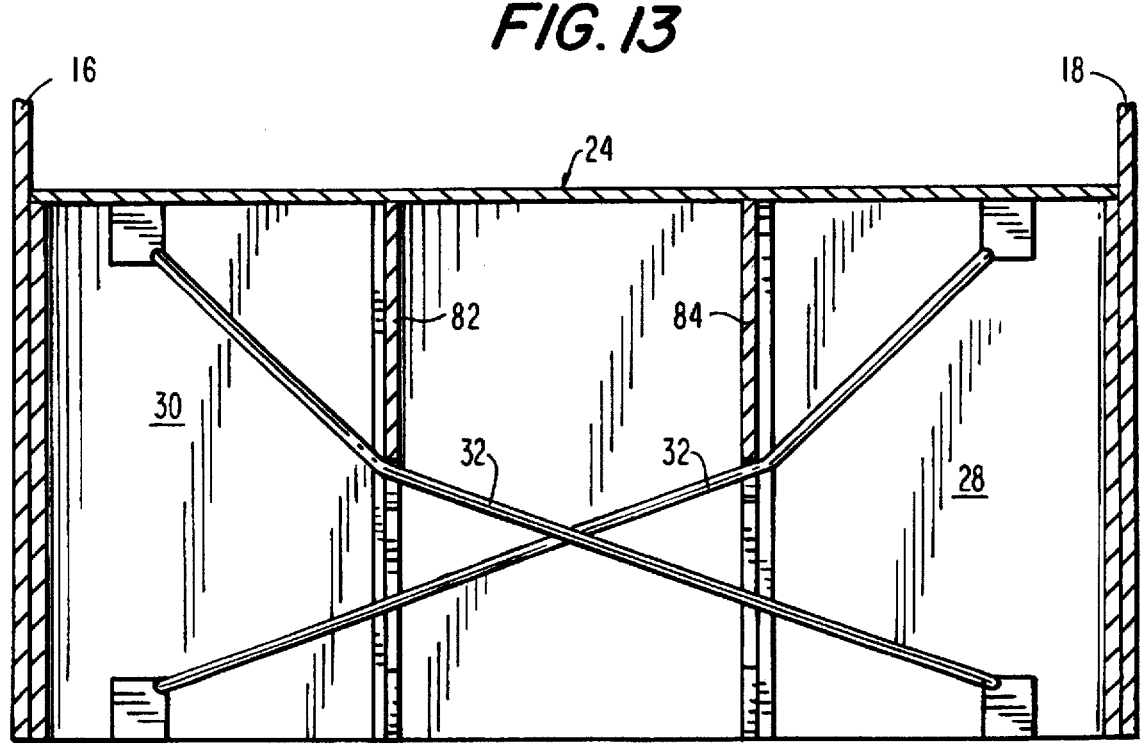
FIG. 13 is an enlarged sectional view taken on line 13—13 of FIG. 11.

FIGS. 9-11 show a preferred commercial embodiment of a wheeled display stand 200 which is similar to the stand 100. Like parts have been identified with like reference numerals. The stand 200 is designed to support a heavier load as compared to the stand 100. For a better grip, rather than employing a handle-forming slot 66, the stand 200 has a rod-like handle 80 that extends through apertured ears 76 formed from the rear panel 12. Also, rather than supporting the shelf 24 merely by the upper edges of the support shelf panels 28, 30, additional reinforcing panels 82, 84 are mounted on the shelf support panels 28, 30 and are employed for additional underside reinforcement from below. Also, as shown in FIG. 13, rather than employing one rubber band, two rubber bands 32 are mounted between the shelf support panels 28, 30, the bands 32 crossing each other in an X-shaped configuration as shown.

As in the case of stand 100, one wheeled assembly 90 is employed and is mounted, as shown in FIG. 10, off the ground in the erect display condition. The wheeled assembly 90 differs from assembly 34 in that assembly 90 includes an elongated support 92 having projections 94 extending in opposite directions from opposite ends of the support 92. A plurality of wheel sub-assemblies 96 are mounted on, and spaced apart along, the support 92. Each sub-assembly 96 includes a wheel 98 journaled on a shaft 102 that extends through a bracket 104 that is stationarily mounted on the support 92. In the preferred embodiment, the support 92 is a block of wood, the bracket is constituted of a plastic material, and the brackets 104 are stapled to the wood block. The end projections 94 are preferably apertured metal disks tightly wedged into opposite ends of the wood block 92.

To attach a pre-assembled wheeled assembly 90 as a unit on the erected stand 200, the side panel portions 16A, 16B and 18A, 18B are pushed apart to their phantom line positions shown in FIG. 11 against the restoring tension of the bands 32. Thereupon, the projections 94 are inserted into pre-formed slots 106 that extend through the side panels. As shown in FIG. 9, each slot 106 extends generally parallel to the inclined rear edges 62, 64. Once the projections 94 are inserted in the slots 106, the bands 32 pull the side panels 16, 18 together and press the side panels into pressing engagement with opposite ends of the support 92. The bands 32 thus serve not only for the automatic erection of the stand, but also to help hold the wheeled assembly in place on the stand.

Figure 12A:
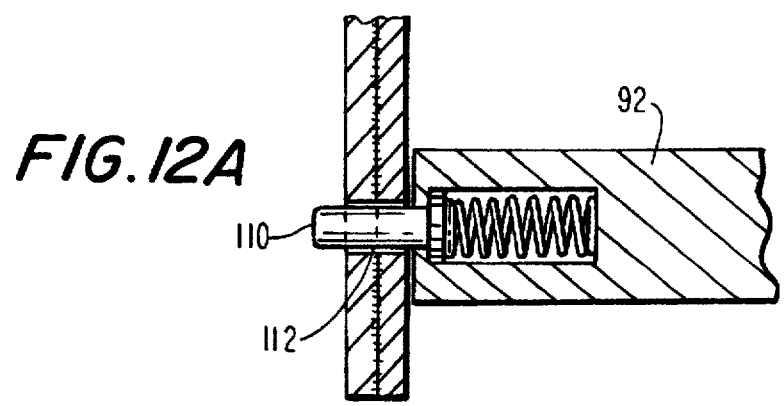
FIG. 12A is a view analogous to FIG. 12, but of a modified locking pin.

In a modified mounting arrangement, as shown in FIG. 12, a locking pin 108 is inserted through each apertured projection 94 in order to more securely lock the assembly in place. In another modified arrangement, as shown in FIG. 12A, each end of the support 92 is provided with a spring-biased button 110 which is urged outwardly through a pre-formed mounting hole 112 in a bottom region of the side panel. Again, these various mounting arrangements allows for quick and easy installation and removal of each wheeled assembly.

It will be understood that each of the elements described above, or two or more together, also may find a useful application in other types of constructions differing from the types described above.

While the invention has been illustrated and described as embodied in a foldable, wheeled display stand, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A foldable, wheeled display stand erectable, when unfolded, from a collapsed condition to an erect display condition, comprising:

an upright rear panel;

a generally planar, upright front panel juxtaposed with the rear panel in the collapsed condition and spaced apart from the rear panel in the erect display condition;

generally planar, upright side panels spaced apart from each other and extending between the front and rear panels at opposite sides of the stand;

each of said panels having bottom edges;

a shelf movable from a first position overlying the rear panel in the collapsed condition, to a load-bearing second position generally perpendicular to the rear panel in the erect display condition, said shelf extending between the front and rear panels and also extending between the side panels in the erect display condition; and a pre-assembled wheeled assembly including a support, at least one wheel journaled on the support, and holder means including a pair of end clips for slidably and frictionally engaging the bottom edges of two of said panels spaced apart from each other in the erect display condition, on the support for attaching the wheeled assembly as a pre-assembled unit to the stand in the erect display condition, and for removing the wheeled assembly as a pre-assembled unit from the stand in the erect display condition.

2. The stand according to claim 1, wherein the end clips bound recesses for receiving the bottom edges of respective panels.

3. The stand according to claim 1, wherein the end clips are mounted at opposite ends of the support, one of the end clips being mounted on the bottom edge of the front panel, and the other of the end clips being mounted on the bottom edge of the rear panel.

4. The stand according to claim 1; and further comprising another pre-assembled wheeled assembly identical to said first-mentioned pre-assembled wheeled assembly, both assemblies being mounted on the stand in the erect display condition.

5. The stand according to claim 1, wherein the end clips are mounted at opposite ends of the support, one of the end clips being mounted on the bottom edge of one of the side panels, and the other of the end clips being mounted on the bottom edge of the other of the side panels.

6. The stand according to claim 5, wherein the bottom edges of the side panels have reclined rear sections on which the end clips are mounted.

7. The stand according to claim 6, wherein the wheeled assembly includes two wheels mounted on and along the support for turning movement between the end clips, said wheels being elevated relative to the ground in the erect display condition.

8. The stand according to claim 1, wherein the wheeled assembly includes two wheels mounted on and along the support for turning movement between the end clips, said wheels engaging the ground in the erect display condition.

9. The stand according to claim 8, wherein the support is a shaft, and wherein the wheels are cylindrical tubes journaled on the shaft.

10. The stand according to claim 1, and further comprising lock means for locking the holder means to the panels.

11. The stand according to claim 1, wherein the lock means includes a pin extending through each end clip and a respective panel.

12. The stand according to claim 1, and further comprising shelf support means movable from a shelf non-supporting position in the collapsed condition, to a shelf-supporting position in which the shelf support means lies underneath the shelf and supports the shelf from below in the erect display condition; and biasing means for affirmatively biasing the shelf support means toward the shelf-supporting position, and for automatically moving the shelf to the load-bearing second position when the stand is unfolded from the collapsed condition.

13. The stand according to claim 12, wherein the shelf support means includes a pair of support panels movable towards and away from each other in a common plane which extends generally perpendicular to the shelf in the erect display condition, and wherein the support panels have upper edges on which the shelf rests in the erect display condition; and wherein the biasing means includes an energy storing element mounted on the support panels.

14. The stand according to claim 12, wherein the biasing means is operative for affirmatively biasing the side panels toward each other and into pressing engagement with the wheeled assembly to hold the latter on the stand.

15. A foldable, wheeled display stand erectable, when unfolded, from a collapsed condition to an erect display condition, comprising:

an upright rear panel;

a shelf movable from a first position overlying the rear panel in the collapsed condition, to a load-bearing second position generally perpendicular to the rear panel in the erect display condition;

a pair of generally planar, upright side panels at opposite sides of the shelf in the erect display position, biasing means for automatically moving the shelf to the load-bearing second position when the stand is unfolded from the collapsed condition, and for affirmatively biasing the side panels toward each other; and a pre-assembled wheeled assembly including a support, at least one wheel journaled on the support, and holder means on the support for attaching the wheeled assembly as a pre-assembled unit to the side panels of the stand in the erect display condition, and for removing the wheeled assembly as a pre-assembled unit from the side panels of the stand in the erect display condition, said biasing means being operative for pulling the side panels into pressed engagement with the wheeled assembly to hold the latter on the stand.

16. The stand according to claim 14; and further comprising shelf support means movable from a shelf non-supporting position in the collapsed condition, to a shelf-supporting position in which the shelf support means lies underneath the shelf and supports the shelf from below in the erect display condition; and wherein the biasing means is operative for affirmatively biasing the shelf support means toward the shelf-supporting position.

17. The stand according to claim 16, wherein the shelf support means includes a pair of support panels movable towards and away from each other in a common plane which extends generally perpendicular to the shelf in the erect display condition, and wherein the support panels have upper edges on which the shelf rests in the erect display condition; and wherein the biasing means includes an energy storing element mounted on the support panels.

18. The stand according to claim 15; and further comprising a generally planar, upright front panel juxtaposed with the rear panel in the collapsed condition and spaced apart from the rear panel in the erect condition; and wherein the generally planar, upright side panels extend between the front and rear panels at opposite sides of the stand; and wherein the shelf extends between the front and rear panels and also extends between the side panels in the erect display condition.

19. The stand according to claim 18, wherein the side panels have floor-engaging, bottom edges, and wherein the holder means is operative for attaching the wheeled assembly to the side panels above the bottom edges in the erect display condition.

20. The stand according to claim 19, wherein the side panels have inclined, rear sections extending from the bottom edges to the rear panel; and wherein the holder means includes a pair of end clips for slidably and frictionally engaging the rear sections.

21. The stand according to claim 20, wherein the end clips bound recesses for receiving the rear sections of the side panels.

22. The stand according to claim 20, wherein the end clips are mounted at opposite ends of the support, one of the end clips being mounted at the rear section of the one of the side panels, and the other of the end clips being mounted at the rear section of the other of the side panels.

23. The stand according to claim 19, wherein the wheeled assembly includes two wheels mounted on and along the support for turning movement intermediate the side panels at an elevation above the ground in the erect display condition.

24. The stand according to claim 23, wherein the support is a shaft, and wherein the wheels are cylindrical tubes journaled on the shaft.

25. The stand according to claim 20; and further comprising lock means for locking the holder means to the side panels.

26. The stand according to claim 25, wherein the lock means includes a pin extending through each end clip and a respective side panel.

27. The stand according to claim 19; and further comprising lock means for locking the holder means to the side panels, said lock means including a spring-biased pin; and further comprising an opening in each side panel for receiving the pin in the erect display condition.

28. The stand according to claim 19, wherein the side panels have slots above the bottom edges, and wherein the holder means includes a pair of end projections extending in opposite directions through the slots.

29. The stand according to claim 28, wherein the wheeled assembly includes two wheels mounted on and along the support for turning movement between the projections intermediate the side panels.

30. The stand according to claim 29, wherein the projections are at opposite ends of the support.

31. The stand according to claim 28, wherein the side panels have inclined, rear sections extending from the bottom edges to the rear panel, and wherein the slots extend parallel to the rear sections.

32. The stand according to claim 28, wherein each end projection has an aperture exteriorly of the respective side panel in the erect display condition; and further comprising lock means for locking the holder means to the side panels, said lock means including a locking element inserted in each aperture.

33. The stand according to claim 30, wherein the support is a rigid board along which a plurality of said wheels are mounted, and wherein the projections are fixedly mounted at opposite end regions of the board.

34. The stand according to claims 30, wherein the support is a rigid board along which a plurality of said wheels are mounted, and wherein the projections are movably mounted at opposite end regions of the board, and means for urging the projections away from each other and through the slots in the side panels.

35. A pre-assembled wheeled assembly for attachment to, and removal from, an erect display stand, comprising:

an elongated support;

at least one wheel journaled on the support; and holder means on the support for attaching the wheeled assembly as a pre-assembled unit to the erect display stand, and for removing the wheeled assembly as a pre-assembled unit from the erect display stand, said holder means including a pair of end clips at opposite ends of the support, and wherein said one wheel is mounted within the support between the end clips.

36. A combination of a pre-assembled wheeled assembly and an erect display stand, said combination comprising:

said stand having a pair of spaced-apart panels to and from which the wheeled assembly is attached and removed, respectively;

an elongated support extending along an axis between the panels;

at least one wheel journaled on the support; and holder means on the support for attaching the wheeled assembly as a pre-assembled unit to the erect display stand, and for removing the wheeled assembly as a pre-assembled unit from the erect display stand, said holder means including a pair of end projections at opposite ends for the support and extending along the axis in opposite directions through the panels, and wherein said one wheel is mounted on the support between the end projections.

* * * * *